United States Patent
Shimizu et al.

(10) Patent No.: US 11,305,997 B2
(45) Date of Patent: Apr. 19, 2022

(54) MULTI-WALLED CARBON NANOTUBE, MULTI-WALLED CARBON NANOTUBE AGGREGATION, AND METHOD FOR PRODUCING THE MULTIWALLED CARBON NANOTUBE

(71) Applicant: TPR CO., LTD., Tokyo (JP)

(72) Inventors: Toshiaki Shimizu, Tokyo (JP); Shinpei Teshima, Tokyo (JP); Yasuhiko Okamura, Tokyo (JP); Yusuke Kawaguchi, Tokyo (JP); Kazuki Otomo, Tokyo (JP); Yuta Koguchi, Tokyo (JP); Katsuhito Suzuki, Tokyo (JP); Yoshio Bando, Tokyo (JP)

(73) Assignee: TPR CO., LTD., Tokyo (JP)

(*) Notice: Subject to any disclaimer, the term of this patent is extended or adjusted under 35 U.S.C. 154(b) by 100 days.

(21) Appl. No.: 16/850,737

(22) Filed: Apr. 16, 2020

(65) Prior Publication Data

US 2020/0339421 A1 Oct. 29, 2020

(30) Foreign Application Priority Data

Apr. 26, 2019 (JP) .............................. JP2019-085046

(51) Int. Cl.
*C01B 32/162* (2017.01)

(52) U.S. Cl.
CPC ........ *C01B 32/162* (2017.08); *C01P 2004/04* (2013.01); *C01P 2004/133* (2013.01); *C01P 2004/30* (2013.01); *C01P 2004/50* (2013.01)

(58) Field of Classification Search
CPC . C01B 32/162; C01B 2202/30; C01B 32/158; C01B 2202/06; C01B 2202/34;
(Continued)

(56) References Cited

U.S. PATENT DOCUMENTS

| | | |
|---|---|---|
| 2014/0255698 A1 | 9/2014 | Kang et al. |
| 2019/0002285 A1 | 1/2019 | Son et al. |

FOREIGN PATENT DOCUMENTS

| | | |
|---|---|---|
| JP | 2006-193380 A | 7/2006 |
| JP | 2014-521589 A | 8/2014 |

(Continued)

OTHER PUBLICATIONS

Chakrabarti, et al., Growth of Super Long Aligned Brush-Like Carbon Nanotubes, Jpn. J. Appl. Phys. 2006; 45(28): L720-L722 (Year: 2006).*

(Continued)

*Primary Examiner* — Daniel C. McCracken
(74) *Attorney, Agent, or Firm* — Cowan, Liebowitz & Latman, P.C.; Mark Montague

(57) ABSTRACT

Applicability to a composite material with high purity and high strength, and a material requiring high conductivity or high thermal conductivity is enhanced. The present invention relates to a multi-walled carbon nanotube having two or more tubes of a graphene sheet where carbon atoms are arranged in a hexagonal honeycomb form, coaxially, wherein a diameter of an outermost wall based on observation of an image by a transmission electron microscope is 3 nm or more and 15 nm or less, and a length based on observation of an image of a scanning electron microscope is 1.0 mm or more, an aggregate of multi-walled carbon (Continued)

nanotubes and a method for preparing the multi-walled carbon nanotube.

6 Claims, 12 Drawing Sheets

(58) Field of Classification Search
CPC ... C01B 2202/36; C01B 32/159; C01B 32/16; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/08; C01B 2202/10; C01B 2202/20; C01B 2202/22; C01B 2202/24; C01B 2202/26; C01B 2202/28; C01B 2202/32; C01P 2004/133; C01P 2004/50; C01P 2004/04; C01P 2004/30; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

FOREIGN PATENT DOCUMENTS

| JP | 2014-166936 | * | 9/2014 | ............. C01B 31/02 |
| JP | 2014-166936 A | | 9/2014 | |
| JP | 2019-014645 A | | 1/2019 | |

OTHER PUBLICATIONS

Allen, et al., Honeycomb Carbon: A Review of Graphene, Chem. Rev. 2010; 110: 132-145 (Year: 2010).*
Huang, et al., 99.9% purity multi-walled carbon nanotubes by vacuum high-temperature annealing, Carbon 2003; 41: 2585-2590 (Year: 2003).*
Machine Translation of JP 2014-166936 to Hata, et al. (Year: 2014).*
Zhang, et al., Synthesis of Carbon Tubule Nanocoils in High Yield Using Iron-Coated Indium Tin Oxide as Catalyst, Jpn. J. Appl. Phys. 2000; 39: L1242-L1244 (Year: 2000).*

* cited by examiner

[FIG.1]
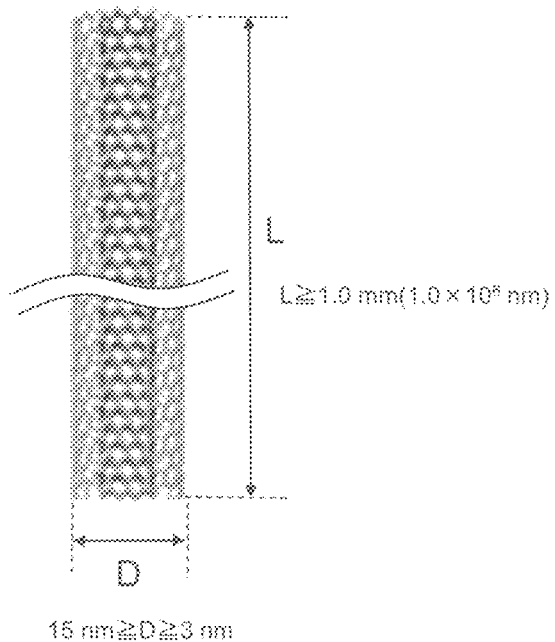

[FIG.2]
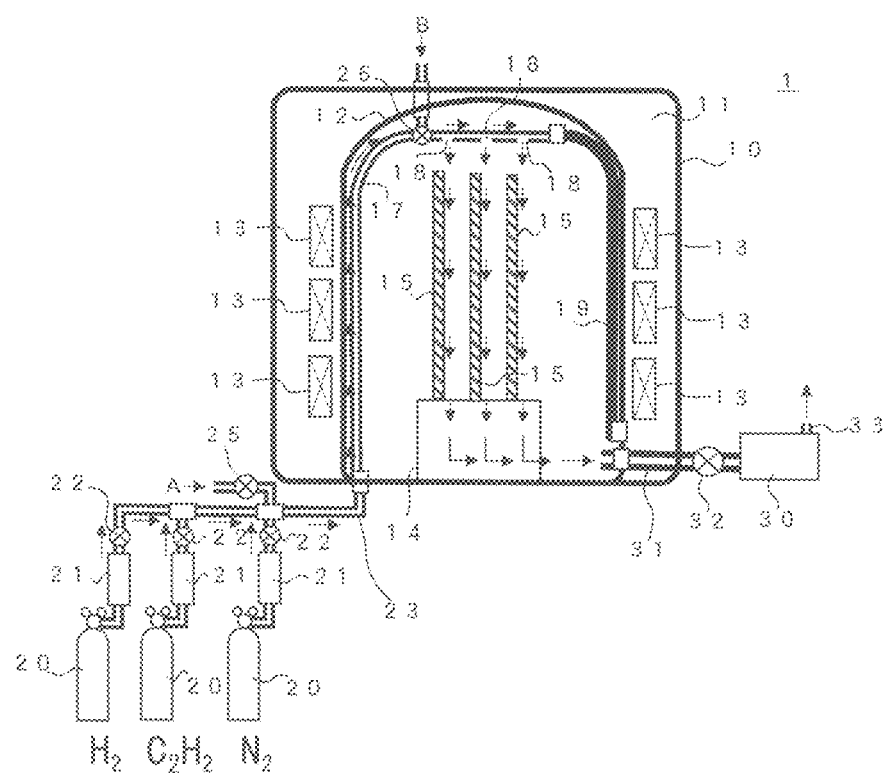

[FIG. 3]
(3A)
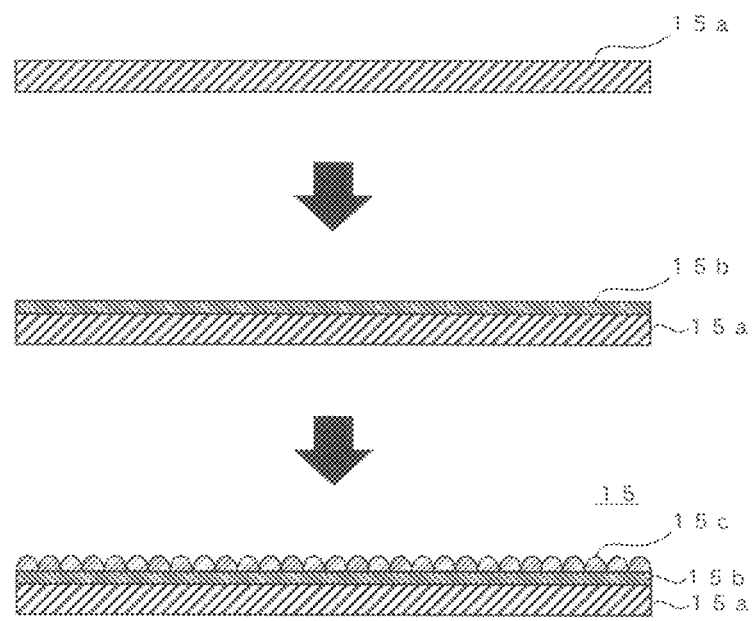
(3B)
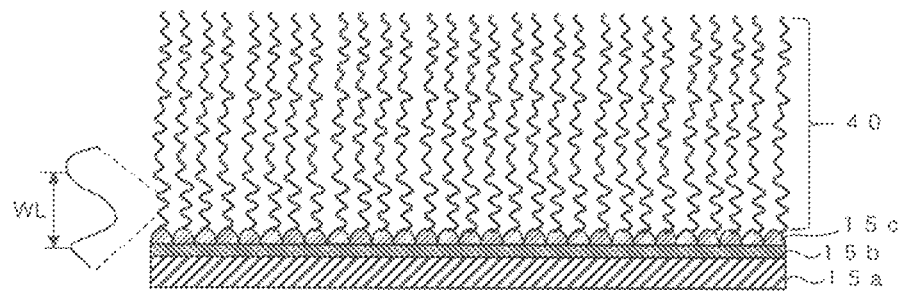
WL: Wavelength

[FIG.4]
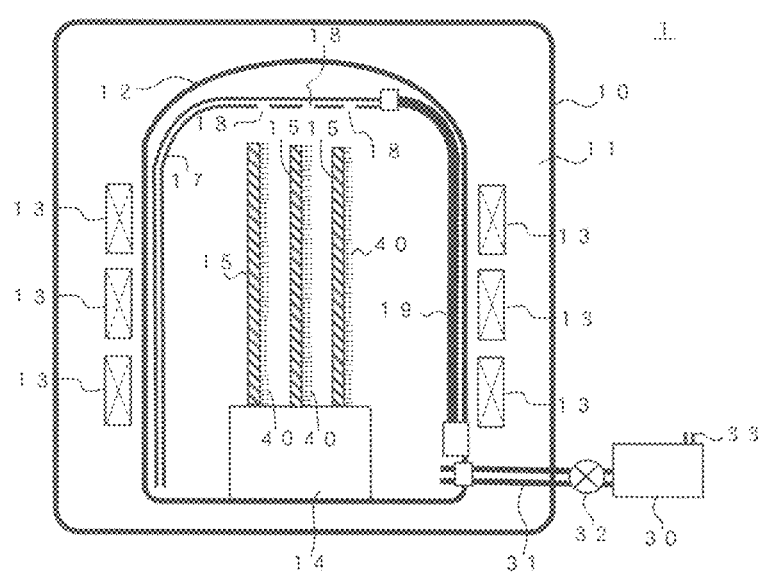

[FIG.5]
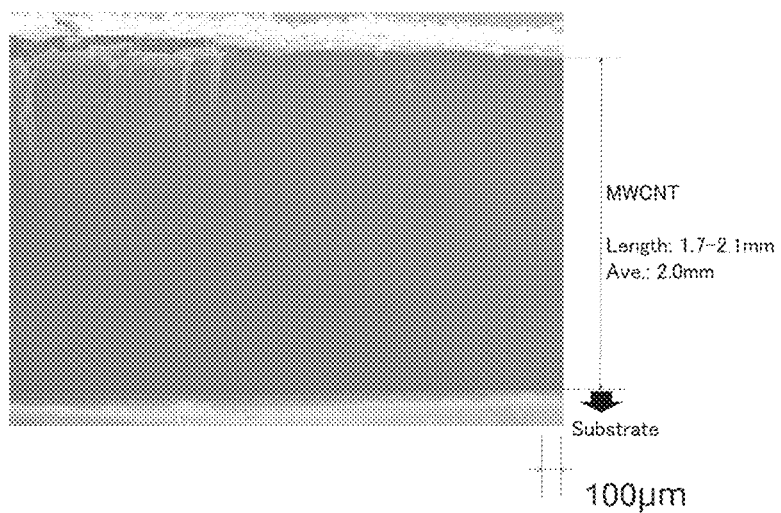
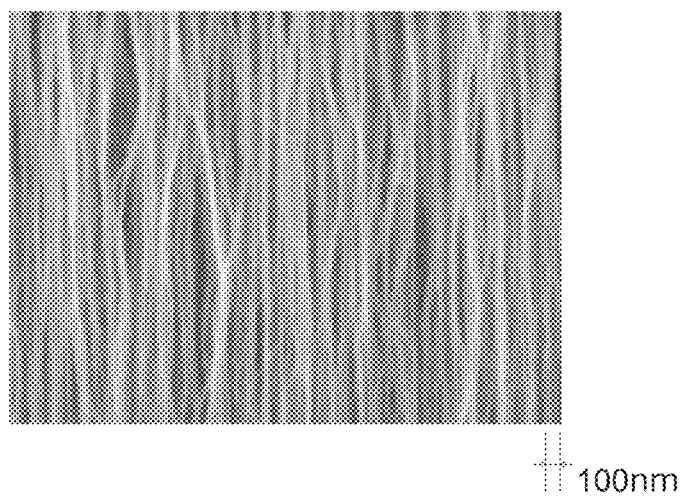

[FIG.6]
Example 1
TEM Image (×1000k)
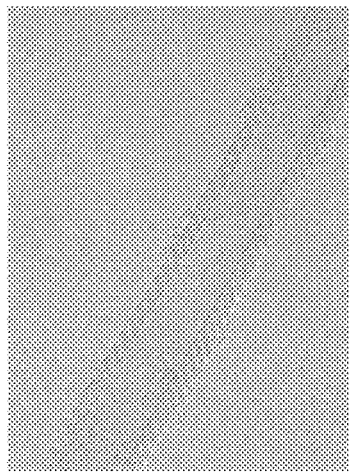
5nm

[FIG. 7]
Example 3
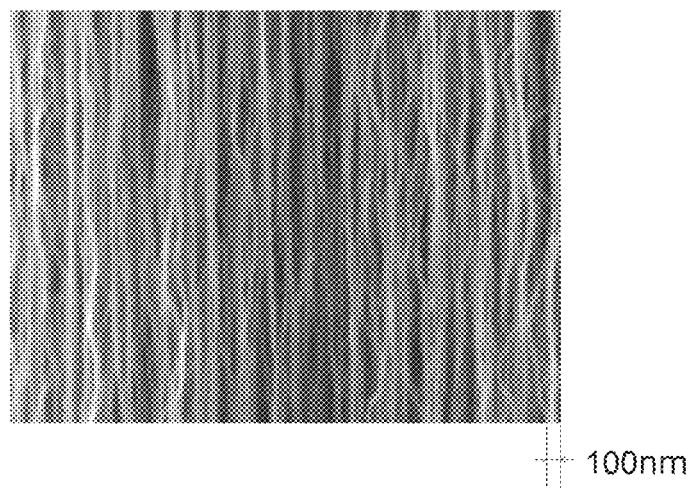

[FIG.8]
Example 4
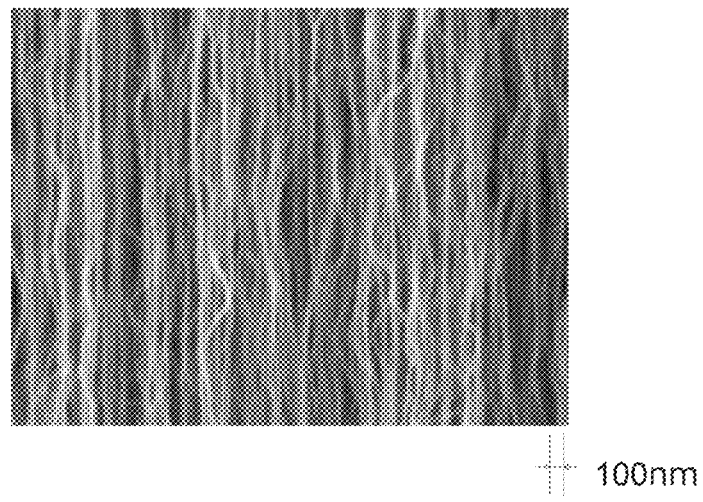

[FIG.9]
Example 1
AFM (2D)
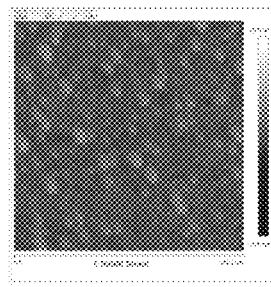
Example 4
AFM (2D)
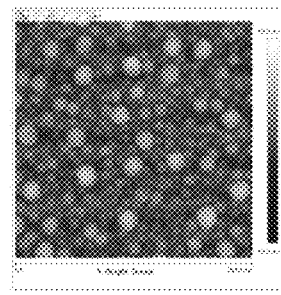
Example 1
AFM (3D)
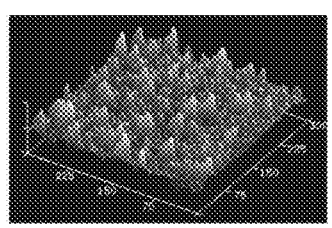
Example 4
AFM (3D)
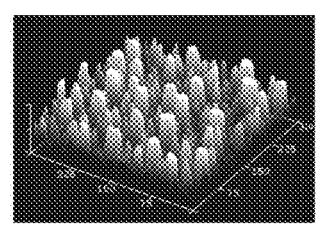

[FIG.10]
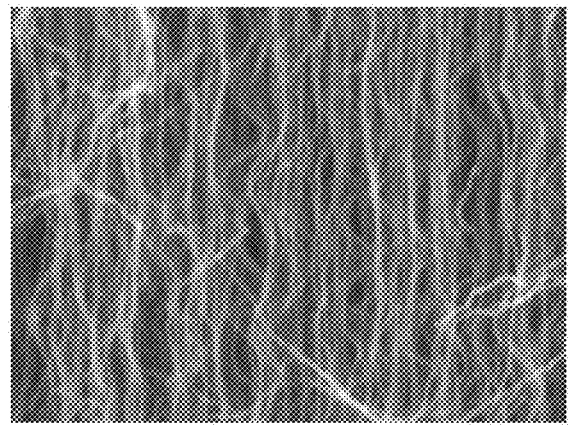

[FIG.11]
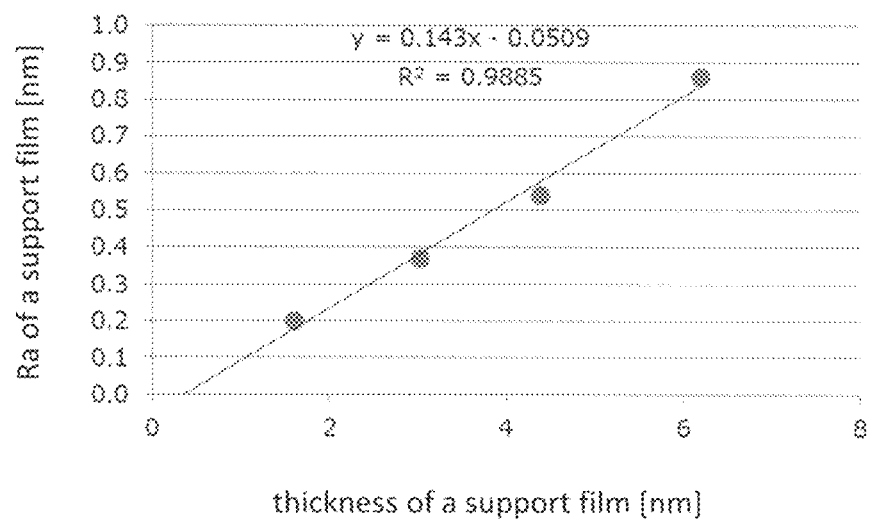

[FIG.12]
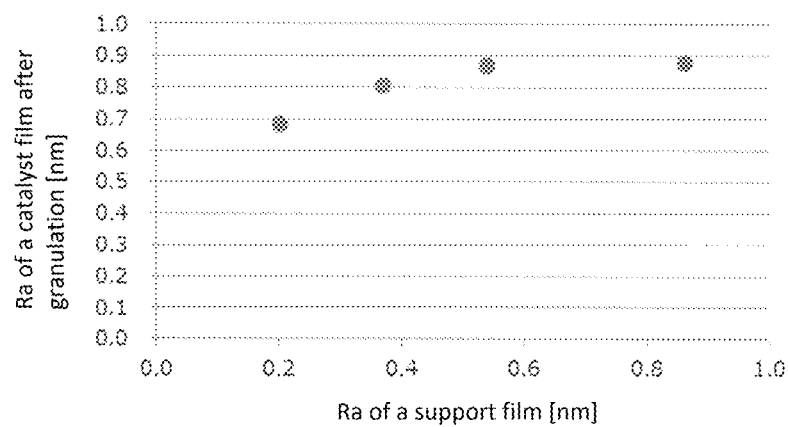

MULTI-WALLED CARBON NANOTUBE, MULTI-WALLED CARBON NANOTUBE AGGREGATION, AND METHOD FOR PRODUCING THE MULTIWALLED CARBON NANOTUBE

CROSS REFERENCE

The present application claims the benefit of priority of Japanese Patent Application No. 2019-085046, filed on Apr. 26, 2019, the entire content of which is incorporated herein by reference. The entire contents of the patents, patent applications, and literatures cited in the present application are also incorporated herein by reference.

BACKGROUND OF THE INVENTION

Field of the Invention

The present invention relates to a multi-walled carbon nanotube, a multi-walled carbon nanotube aggregate and a method for preparing a multi-walled carbon nanotube.

Description of the Related Art

A carbon nanotube (Carbon Nanotube: CNT) is a nanoscale material having a one or two-walled cylindrical structure obtained by rolling a graphene sheet. A single-walled carbon nanotube (Single-Walled Carbon Nanotube: SWCNT) having a single-walled cylindrical structure obtained by rolling a graphene sheet is excellent in various properties such as electrical properties, thermal properties, optical properties, hydrogen storage capacity, and metal catalyst support capacity. Further, SWCNT becomes metallic or semiconducting depending on the geometric structure determined by a chiral index (n, m). Accordingly, SWCNTs are receiving attention as materials for electronic devices, electrodes for power storage devices, MEMS members, fillers for functional composite materials and the like (See Japanese Patent Laid-Open No. 2014-166936).

On the other hand, a multi-walled carbon nanotube (Multi-Walled Carbon Nanotube: MWCNT) having two or more walls obtained by rolling a graphene sheet includes properties excellent in thermal stability and chemical stability. Even when the surface of MWCNT is modified, the internal cylindrical structure can be maintained and the properties as CNT can be exhibited. CNTs including MWCNT are materials difficult to mix into solvents such as water and organic solvents, or polymer solutions in general. However, by oxidizing the surface of MWCNT, a carboxy group is bonded to the surface, and further reacted with thionyl chloride to form a carbonyl group on the surface, and thereby it becomes easy to disperse MWCNT into the above described solvent or polymer while maintaining the properties as CNT (see Japanese Patent Laid-Open No. 2006-193380).

CNT can be prepared by, for example, an arc discharge method, a laser ablation method, or a chemical vapor deposition method (see Japanese Translation of PCT International Application Publication No. 2014-521589). Among these preparation methods, the chemical vapor deposition (Chemical Vapor Deposition: CVD) method enables cost reduction of CNT, because the CVD method can be used in preparing both SWCNT and MWCNT, and is more suitable for mass production as compared with the two former methods. The CVD method is broadly divided into a fluidized-bed type CVD method (also called a gas phase catalyst CVD method) that generates CNT on a catalyst surface while flowing the catalyst and reaction gas, and a fixed-bed type CVD method (also called a catalyst-supported CVD method) that positions a substrate supporting a catalyst in a reaction vessel and generate CNT on the substrate by supplying gas into the reaction vessel (see Japanese Patent Laid-Open No. 2019-014645). In general, the fluidized-bed type CVD method is more excellent in mass productivity as compared with the fixed-bed type CVD method.

The length of CNT that can be prepared by an arc discharge method, a laser ablation method, or a CVD method has been limited to 100 to 200 µm. One of the causes is that the life of the catalyst is short. As a CVD method that elongates the life of the catalyst like this, a method called a super growth method has been developed. The super growth method significantly increases the activity and life of the catalyst by adding a small amount of water to raw material gas, and enables production of a long SWCNT of several hundreds µm to 1 mm.

However, in the production of MWCNT, a method having a length on the millimeters has not yet been established. MWCNT with a small number of walls and a length on the order of millimeters (1 mm or more) has a low metal impurity concentration and high purity, so that the MWCNT has an excellent effect of being used as a conductive auxiliary agent for batteries, and can construct a high-strength molded body when the MWCNT is formed into the molded body because the MWCNT is excellent in network properties. When MWCNT is added into a resin or a rubber, MWCNT can be expected as a material that exhibits excellent electric conductivity performance or thermal conductivity in a small amount.

In order to respond to the above described expectation, the present invention has an object to provide a long multi-walled carbon nanotube with a small number of walls, and an aggregate of the multi-walled carbon nanotube.

SUMMARY OF THE INVENTION (1) A multi-walled carbon nanotube according to one embodiment to achieve the above described object is a carbon nanotube having two or more tubes of a graphene sheet where carbon atoms are arranged in a hexagonal honeycomb form, coaxially, wherein a diameter of an outermost wall based on observation of an image by a transmission electron microscope is 3 nm or more and 15 nm or less, and a length based on observation of an image of a scanning electron microscope is 1.0 mm or more.

(2) In a multi-walled carbon nanotube according to another embodiment, a wave where an average period based on observation of an image by a scanning electron microscope is 0.5 µm or more and 2.0 µm or less is preferably formed in a lengthwise direction.

(3) A multi-walled carbon nanotube aggregate according to one embodiment to achieve the above describe object is an aggregate of multi-walled carbon nanotubes each having two or more tubes of a graphene sheet where carbon atoms are arranged in a hexagonal honeycomb form, coaxially, wherein an average diameter of outermost walls based on observation of an image by a transmission electron microscope is 6 nm or more and 12 nm or less, and an average length based on observation of an image of a scanning electron microscope is 1.4 mm or more.

(4) In a multi-walled carbon nanotube aggregate according to another embodiment, in a lengthwise direction of multi-walled carbon nanotubes in the multi-walled carbon nanotube aggregate, waves where average periods based on observation of an image by a scanning electron microscope are 0.5 μm or more and 2.0 μm or less are preferably formed.

(5) In a multi-walled carbon nanotube aggregate according to another embodiment, a metal content is preferably 250 ppm or less by weight.

(6) A method for preparing a multi-walled carbon nanotube according to one embodiment to achieve the above described object is a method for preparing a multi-walled carbon nanotube by a chemical vapor deposition method by holding a substrate supporting a metal catalyst on a surface, in a reaction vessel, and is a method including forming a support film for supporting the metal catalyst, on a surface of a smooth plate, supporting a metal catalyst formed from a manganese, iron, cobalt, nickel, molybdenum, palladium, indium, tin, or an alloy containing one or more of these metals, on the support film, disposing the one or more substrates having a catalyst film formed of the metal catalyst formed on a surface of the support film, in the reaction vessel, bringing an inside of the reaction vessel under an atmosphere of inert gas or oxidizing gas, heating the inside of the reaction vessel to a synthesis temperature of the multi-walled carbon nanotube, granulating the catalyst film by exposing the catalyst film to an atmosphere of gas having reducing activity, and thermally decomposing the hydrocarbon to grow multi-walled carbon nanotubes on the surface of the catalyst film of the substrate, as introducing raw material gas containing at least hydrogen and hydrocarbon from one end of the substrate to another end to contact the raw material gas to a surface of the catalyst film while preheating the raw material gas to a temperature capable of promoting thermal decomposition of the hydrocarbon on the catalyst film and lower than the synthesis temperature, and exhausting the inside of the reaction vessel unidirectionally by a non-circulation method to generate a current in a direction from the one end of the substrate to the another end in the reaction vessel.

(7) A method for preparing a multi-walled carbon nanotube according to another embodiment is preferably a method that, by using an apparatus where the substrate is disposed in a space surrounded by a heater, and a pipe for introducing gas is disposed between the heater and the substrate, passes the gas containing at least hydrogen and hydrocarbon through the pipe and supplies the gas from the one end of the substrate while preheating the gas.

(8) A method for preparing a multi-walled carbon nanotube according to another embodiment is preferably a method, wherein the catalyst film is a film having a center line average roughness (Ra) after granulation of 0.80 nm or more.

(9) A method for preparing a multi-walled carbon nanotube according to another embodiment is preferably a method, wherein the support film is a film having a center line average roughness (Ra) of 0.37 nm or more.

According to the present invention, applicability to composite materials with high purity and high strength, and material requiring high conductivity or high thermal conductivity is increased.

BRIEF DESCRIPTION OF THE DRAWINGS

FIG. 1 is a view for explaining a multi-walled carbon nanotube according to a present embodiment;

FIG. 2 is a schematic configuration of an MWCNT preparing apparatus used in a method for preparing a multi-walled carbon nanotube according to the present embodiment;

FIG. 3 shows a sectional view (3A) of a situation where a support film and a catalyst film are stacked in order on a smooth plate, and a sectional view (3B) of a state where MWCNT is generated on the catalyst film of a substrate;

FIG. 4 schematically shows a state in a reaction vessel in a state where MWCNTs are generated on substrates by the apparatus in FIG. 2;

FIG. 5 is an SEM photograph (magnification in shooting: 40 times and 30000 times) of MWCNTs (with substrate) obtained in example 1, viewed from a side;

FIG. 6 is a TEM image of MWCNT similar to that in FIG. 5;

FIG. 7 is an SEM photograph of MWCNTs (with substrate) obtained in example 3, viewed from a side;

FIG. 8 is an SEM photograph of MWCNTs (with substrate) obtained in example 4, viewed from a side;

FIG. 9 is AFM images (2D images and 3D images) by an atomic force microscope, of catalyst films of the substrates used in examples 4 and 1;

FIG. 10 is an SEM photograph of MWCNT (with substrate) obtained in example 5, viewed from a side;

FIG. 11 shows a graph where a relationship between a thickness of a support film and Ra is plotted; and FIG. 12 shows a graph where a relationship between Ra of the support film in FIG. 11 and Ra after granulation of a catalyst film is plotted.

DETAILED DESCRIPTION OF THE PREFERRED EMBODIMENT

Next, an embodiment of the present invention will be described with reference to the drawings. Note that the embodiment described as follows does not limit the invention according to the claims, and all of various elements and combinations thereof described in the embodiment are not always essential to the solution to the present invention.

1. Definition (1) Multi-Walled Carbon Nanotube

A multi-walled carbon nanotube refers to a carbon nanotube including two or more tubes of a graphene sheet where carbon atoms are arranged in a hexagonal honeycomb form, coaxially, and is differentiated from a single-walled carbon nanotube having only one tube of a graphene sheet.

(2) Multi-Walled Carbon Nanotube Aggregate

A multi-walled carbon nanotube aggregate is a collection of a plurality of multi-walled carbon nanotubes, and the number thereof is not limited.

(3) Graphene Sheet

A graphene sheet is a sheet of sp2 bonded carbon atoms of a thickness of one atom, and is a sheet where carbon atoms have a hexagonal lattice structure.

(4) Support Film

A support film is also called a support layer, and refers to a film formed to support a catalyst. The support film may be either a film reacting with a surface of a plate to which the support film is attached or a film that does not react with the surface. A multi-walled carbon nanotube is generated on the surface of a catalyst film in a substrate having a three-layer structure of a smooth plate/support film/catalyst film.

(5) Catalyst Film

A catalyst film is also called a catalyst layer, and is a film formed by depositing a metal catalyst on a support film.

(6) Raw Material Gas

Raw material gas refers to gas to be a raw material for generating multi-walled carbon nanotubes. The raw material gas also includes hydrogen in addition to hydrocarbon of a carbon source. Further, the raw material gas may include inert gas (for example, helium gas, nitrogen gas, argon gas) as carrier gas.

(7) Center Line Average Roughness (Ra)

A center line average roughness is also called an arithmetic average roughness, and refers to a value obtained by folding a roughness curve from a center line, and dividing an area obtained by the roughness curve and the center line by a length. In the present application, Ra can be obtained by using an atomic force microscope (AFM) based on ASME Y14.36 M.

(8) Diameter of Multi-Walled Carbon Nanotube

A diameter of a multi-walled carbon nanotube refers to a diameter of an outermost wall of a multi-walled carbon nanotube measured by observing an image of the multi-walled carbon nanotube by a transmission electron microscope (TEM). Hereinafter, the diameter will be shown in a unit of nanometer (nm).

(9) Length of Multi-Walled Carbon Nanotube

A length of a multi-walled carbon nanotube refers to a length of a multi-walled carbon nanotube measured by observing an image of the multi-walled carbon nanotube by a scanning electron microscope (SEM). Hereinafter, the length will be shown in a unit of millimeter (mm).

(10) Aspect Ratio of Multi-Walled Carbon Nanotube

An aspect ratio of a multi-walled carbon nanotube refers to a length of the multi-walled carbon nanotube to a diameter of an outermost wall of the multi-walled carbon nanotube (that is, the length/diameter).

(11) Average Diameter of Multi-Walled Carbon Nanotube

An average diameter of multi-walled carbon nanotubes (may be called an aggregate of multi-walled carbon nanotubes) refers to an average value of diameters of outermost walls of multi-walled carbon nanotubes measured by arbitrarily selecting images of 30 multi-walled carbon nanotubes by TEM and observing them. Hereinafter, the average diameter will be shown in a unit of nanometer (nm).

(12) Average Length of Multi-Walled Carbon Nanotubes

An average length of multi-walled carbon nanotubes (may be called an aggregate of multi-walled carbon nanotubes) refers to an average value of lengths of multi-walled carbon nanotubes measured by arbitrarily selecting images of 30 multi-walled carbon nanotubes by SEM and observing them. Hereinafter, the average length will be shown in a unit of millimeter (mm).

(13) Average Aspect Ratio of Multi-Walled Carbon Nanotubes

An average aspect ratio of multi-walled carbon nanotubes (may be called an aggregate of multi-walled carbon nanotubes) refers to a value obtained by dividing an average length of the multi-walled carbon nanotubes by an average diameter.

(14) Wave

A wave refers to a form where a multi-walled carbon nanotube undulates to form swells in a lengthwise direction.

(15) Average Period

An average period refers to an average value (average wavelength) of lengths corresponding to wavelengths in a case of swells formed in the lengthwise direction of a multi-walled carbon nanotube reciprocating in a direction orthogonal to the lengthwise direction. The average period (average wavelength) of a multi-walled carbon nanotube refers to an average value obtained by observing the multi-walled carbon nanotube by an SEM, selecting 30 wavelengths arbitrarily along the lengthwise direction of one multi-walled carbon nanotube, and dividing a total distance of 30 wavelengths by 30. Hereinafter, the average period will be shown in a unit of micron meter (μm).

2. Multi-Walled Carbon Nanotube and Multi-Walled Carbon Nanotube Aggregate

FIG. 1 shows a view for explaining a multi-walled carbon nanotube according to the present embodiment.

The multi-walled carbon nanotube (hereinafter, also called MWCNT) according to the present embodiment is a carbon nanotube having two or more tubes of the graphene sheet where carbon atoms are arranged in a hexagonal honeycomb form, layered coaxially, and has at least characteristics (a) and (b) as follows.

(a) A diameter ("D" in FIG. 1) of an outermost wall observed from an image by a transmission electron microscope is 3 nm or more and 15 nm or less.

(b) A length ("L" in FIG. 1) observed from an image by a scanning electron microscope is 1.0 mm or more.

A diameter of an outermost wall of MWCNT according to the embodiment is 3 nm or more and 15 nm or less, and preferably 5 nm or more and 13 nm or less. The number of walls of MWCNT according to the embodiment is two or more and 15 or less, is preferably 3 or more and 12 or less, and more preferably three or more and 7 or less. The MWCNT can also include a nanohorn having a tip end thereof closed. When the diameter of the outermost wall of MWCNT is 3 nm or more, the number of walls of a graphene is two or more, so that the MWCNT is excellent in thermal stability and conductivity. When the diameter of the outermost wall of MWCNT is 15 nm or less, and further, 13 nm or less, an aspect ratio of the MWCNT is high, so that it becomes easy to mix the MWCNT with a polymer on a submicron order, metallic or ceramics particles, fiber or whisker.

A length of the MWCNT in the embodiment is 1.0 mm or more. The length of the MWCNT is preferably 1.0 mm or more and 2.5 mm or less, more preferably 1.5 mm or more and 2.5 mm or less, and further more preferably 2.0 mm or more and 2.5 mm or less. When the length of MWCNT is long and 1.0 mm or more, the MWCNT can exhibit higher conductivity even with a same content, as compared with a short MWCNT having a length of the MWCNT of less than 1 mm, when mixed with a rubber, resin or other materials with a lower electric conductivity than the MWCNT. This is considered to be because the short MWCNTs can exhibit a predetermined conductivity by contacting a large number of MWCNTs to one another in a daisy chain, whereas the long MWCNTs can exhibit the same conductivity with contact of a small number of MWCNTs. However, when the lengths of MWCNTs exceed 2.5 mm, the MWCNTs easily form a large lump when the MWCNTs are dispersed into a metal, resin, rubber or ceramics, and tend to be dispersed unevenly. Accordingly, the length of MWCNT is more preferably 1.0 mm or more and 2.5 mm or less, further more preferably 1.5 mm or more and 2.5 mm or less, and much more preferably 2.0 mm or more and 2.5 mm or less.

The aspect ratio of the MWCNT is 66,666 or more, preferably 100000 or more, and further more preferably 133333 or more. Considering that the preferable length of the MWCNT is 1.0 mm or more and 2.5 mm or less, more preferably 1.5 mm or more and 2.5 mm or less, and further more preferably 2.0 mm or more and 2.5 mm or less, the aspect ratio of the MWCNT is preferably 66666 or more and 833333 or less, more preferably 100000 or more and 833333 or less, and further more preferably 133333 or more and 833333 or less. The aspect ratio of the MWCNT may be 120000 or more and 500000 or less.

In the aggregate of the MWCNTs, an average diameter of outermost walls of the MWCNTs is preferably 6 nm or more and 12 nm or less, or 7 nm or more and 12 nm or less, and is more preferably 9 nm or more and 12 nm or less. The "average diameter" is an average value of the diameters of the outermost walls measured from 30 MWCNTs existing in an image of a transmission electron microscope and selected arbitrarily. When the average diameter is 6 nm or more, a ratio of the MWCNTs with a number of walls of a graphene is four or more increases, so that a filler excellent in thermal stability and conductivity is provided. Further, when the average diameter is 12 nm or less, and further, is 11 nm or less, a ratio of MWCNTs with large aspect ratios increases, so that mixing with a polymer on a submicron order, metal or ceramics particles, fiber or whisker becomes easy. Accordingly, a composite material where MWCNTs are dispersed into a rubber, resin, metal or ceramics is easily produced.

An average length of the MWCNTs of the aggregate of the MWCNTs is preferably 1.4 mm or more and 2.5 mm or less. The "average length" is an average value of lengths measured from 30 MWCNTs existing in an image of the scanning electron microscope and arbitrarily selected. When the average length is 1.4 mm or more, the ratio of the MWCNTs having large aspect ratios increases, so that high conductivity can be exhibited even with a same content. Further, when the average length is 2.5 mm or less, a ratio of agglomerates of the MWCNTs decreases, so that uniform dispersion of the MWCNTs into a rubber, resin, metal or ceramics becomes easy.

The average aspect ratio of the MWCNT is preferably 116666 or more and 416666 or less, more preferably 116666 or more and 277777 or less, and further more preferably 180000 or more and 240000 or less. As the average aspect ratio is larger, the strength, conductivity or thermal conductivity can be more increased with a smaller amount when mixed into a rubber, resin or the like, leading to a reduction in the content of metal impurities. However, when the aspect ratio is too large, it is difficult to mix the MWCNTs uniformly, and agglomerates may be generated. Accordingly, when an ordinary mixing method is used, the average aspect ratio more preferably has an upper limit as described above.

A value of a BET specific surface area of the MWCNT (multipoint method by gas adsorption) is preferably 200 $m^2/g$ or more and 675 $m^2/g$ or less, and more preferably 225 $m^2/g$ or more and 450 $m^2/g$ or less. The BET specific surface area is obtained by using a plurality of multi-walled carbon nanotubes as samples. The MWCNT may have a functional group such as a carboxy group.

The MWCNT according to the embodiment forms a wave at average periods of 0.5 µm or more and 2.0 µm or less, and in a smaller range, at average periods of 0.8 µm or more and 2.0 µm or less, in a lengthwise direction thereof, under conditions described later. The MWCNT having the wave at a very short period as described above increases a chance of contact between a metal filler, a filler of an organic polymer, or an inorganic filler and the MWCNT as compared with MWCNT having a long-period wave, in extreme cases straight MWCNT without waves, and therefore mixing with the above described fillers becomes easier.

A metal content in the aggregate of MWCNTs is preferably 250 ppm or less by weight. The metal content means a ratio of mass occupied by metal to total mass of MWCNT (including metal). The metal mainly comes from the catalyst metal. Since the MWCNT is longer than before, the metal content can be made lower than before even if the MWCNT is extracted from a base of a catalyst film and contains a metal catalyst. If the MWCNT is cut in a position away from the catalyst film, the metal content can be made zero or as close to zero as possible.

A G/D ratio of the aggregate of the MWCNTs is preferably 0.8 or more. In general, a G/D ratio is an indicator of a height (low impurity level) of crystallinity of CNT, meaning that the larger the G/D ratio, the higher the crystallinity (lower in impurities other than graphite), and the fewer defects. The G/D ratio is a value obtained by dividing a peak intensity of G-band of a Raman spectrum measured by using a Raman spectrophotometer by a peak intensity of a D-band. The G-band is a peak coming from a graphite structure and appearing in a vicinity of 1590 $cm^{-1}$ of a Raman spectrum. The D-band is a peak coming from a defect and appearing in a vicinity of 1350 $cm^{-1}$ of a Raman spectrum.

3. Method for Preparing Multi-Walled Carbon Nanotube

(1) Preparing Apparatus

FIG. 2 shows a schematic configuration of an MWCNT preparing apparatus for use in a method for preparing a multi-walled carbon nanotube according to the present embodiment.

In the present application, the method for preparing a multi-walled carbon nanotube may be referred to as a method for preparing a multi-walled carbon nanotube aggregate.

An MWCNT preparing apparatus (hereinafter, called an "apparatus") 1 according to the present embodiment includes a first vessel 10, a raw material gas supply vessel 20, and a pump 30. The first vessel 10 includes a second vessel 12 in an internal space 11. The second vessel 12 is a reaction vessel for synthesizing CNTs via a reaction of a raw material gas by a CVD method. A heater 13 that is annular when viewed from above the apparatus 1 is disposed between the first vessel 10 and the second vessel 12. The heater 13 is disposed in three stages in an up-down direction (vertical direction) of the second vessel 12. This is to make a temperature in the vertical direction (up-down direction) of the second vessel 12 as uniform as possible. Note that the heater 13 may be one, two or four annular heaters. The heater 13 is heating means for heating not only a substrate described later, but also an entire interior of the second vessel 12.

The second vessel 12 is a sealable vessel, and a reaction vessel for synthesizing (also called generating or preparing) MWCNTs. The second vessel 12 includes a base 14 on a bottom portion thereof. The base 14 has three substrates 15 erected on a top surface of the base 14 with spaces among them. The number of substrates 15 is not limited to three, but may be one, two or four or more. The second vessel 12 includes a pipe 17 capable of introducing the raw material gas from the raw material gas supply vessel 20 to above the substrates 15. The pipe 17 has an inverted L-shape extending substantially vertically upward along a vicinity of the heater 13 from a bottom portion of the second vessel 12 and thereafter curving to extend substantially parallel with top ends of the substrates 15. The pipe 17 includes holes 18 each capable of ejecting the raw material gas to be able to supply the raw material gas along one surfaces of the substrates 15, on a side opposing the top ends of the substrates 15. In the embodiment, in the second vessel 12, the three substrates 15 are erected on the base 14. Accordingly, the pipe 17 has one or more holes 18. The pipe 17 is fixed by a support member 19 in a substantially inverted J-shape fixed to an inner wall of the second vessel 12. The pipe 17 includes a valve 26 at an upstream side of the holes 18 in a gas flowing direction. The valve 26 connects a branch pipe to form a T-shape to the pipe 17. The branch pipe is used when the raw material gas or exhaust gas from the pump 30 is introduced into the second vessel 12 without being preheated with the heater 13.

The apparatus 1 includes the raw material gas supply vessels 20 respectively for hydrogen gas, hydrocarbon gas and inert gas. These three raw material gas supply vessels 20 are connected to a pipe 23 via flowmeters (for example, mass flow controllers: MFC) 21 and valves 22. The pipe 23 is connected to the pipe 17, in the bottom portion of the second vessel 12. In the pipe 23, a pipe with a valve 25 is connected to a merging position of all the raw material gases or downstream of the merging position. The pipe is used when introducing gas discharged from the pump 30, from an arrow A in FIG. 2 (2A).

The second vessel 12 includes a pipe 31 penetrating from outside of the first vessel 10 to reach the inside of the second vessel 12, in a lower position from lower ends of the substrates 15. The pipe 31 is connected to a pump 30 disposed outside the first vessel 10, via a valve 32. The pump 30 includes an exhaust port 33.

(2) Raw Material Gas

Raw material gas used in this embodiment is a hydrogen gas, hydrocarbon gas and inert gas. Oxidizing gas (air, oxygen, carbon monoxide, carbon dioxide and the like) may be used instead of the inert gas or with the inert gas. As the hydrocarbon gas, saturated hydrocarbon gas, unsaturated hydrocarbon gas or a mixture gas of these gases can be used. The hydrocarbon gas is preferably unsaturated hydrocarbon gas, more preferably an aliphatic unsaturated hydrocarbon gas, and further more preferably acetylene, or ethylene. As the inert gas, gas such as helium, nitrogen, neon, argon, krypton and xenon can be illustrated. The raw material gas does not have to include an inert gas. The most preferable component of the raw material gas is a combination of hydrogen gas, acetylene gas and nitrogen gas, or a combination of hydrogen gas, acetylene gas and argon gas.

A flow rate of the hydrogen gas is preferably 80 slm or more and 500 slm or less, more preferably 100 slm or more and 360 slm or less, and further more preferably 120 slm or more and 300 slm or less. Here, "slm" means a flow rate expressed by L/min at 0° C. and 1 atom. A flow rate of the hydrocarbon gas is preferably 5 slm or more and 150 slm or less, more preferably 10 slm or more and 100 slm or less, and further more preferably 15 slm or more and 80 slm. A flow rate of the inert gas and/or the oxidizing gas is preferably 10 slm or more and 400 slm, more preferably 20 slm or more and 300 slm or less, and further more preferably 30 slm or more and 200 slm or less. Note that a relationship among the flow rates of the respective gases is preferably hydrogen gas≥inert gas and/or oxidizing gas>hydrocarbon gas.

(3) Pressure in Second Vessel

Pressure in the second vessel 12 in preparing MWCNTs is preferably 5 kPa or more and 100 kPa or less, and more preferably 10 kPa or more and 80 kPa or less. The pressure in the second vessel 12 is retained while supplying the raw material gas to the second vessel 12 and discharging gas by the pump 30.

(4) Synthesis Temperature of MWCNT

The space in the second vessel 12 is heated to a temperature capable of synthesizing MWCNT by energizing the heater 13 disposed outside of the second vessel 12 in generating MWCNTs on the catalyst films formed on the surfaces of the substrates 15, more specifically, outermost surfaces of the substrates 15. A synthesis temperature can be changed according to the kind of the raw material gas (in particular, hydrocarbon), and the kind of the catalyst. The synthesis temperature in the embodiment is preferably 350° C. or more and 850° C. or less, more preferably 550° C. or more and 800° C. or less, and further more preferably 650° C. or more and 780° C. or less.

(5) Preheating of Raw Material Gas

The raw material gas is supplied to the surfaces (surfaces where the catalyst films are formed) of the substrates 15 from the holes 18 through the pipe 17 disposed inside of the second vessel 12. The raw material gas is preheated when passing in the pipe 17, and therefore easily generates MWCNTs on the catalyst films. Preheating of the raw material gas is an important factor to elongation of MWCNTs.

The present inventor tried a method of supplying the raw material gas to the second vessel 12 without preheating the raw material gas and discharging the gas from the pump 30 by a non-circulation method. However, it is found that the method was not able to elongate the length of MWCNT 40 to be longer than before, and it is difficult to grow the MWCNT to a length of 1.0 mm or more.

On the other hand, it is found that when the raw material gas is preheated and supplied to the second vessel 12, and is discharged by the pump 30 by a non-circulation method, the length of the MWCNT 40 can be grown to 1.0 mm or more. It is considered that preheating of the raw material gas helps the hydrocarbon gas in the raw material gas to be supplied to the second vessel 12 and thermally decomposed easily on the surfaces of the catalyst films 15c. Preheating is preferably such that raw material gas is preferably heated to a temperature capable of promoting thermal decomposition of the hydrocarbon on the catalyst film 15c, and lower than the synthesis temperature (=temperature in the second vessel 12) of the MWCNT 40, that is, the temperature measured in the position where the raw material gas is ejected to the second vessel 12. Further, the temperature of preheating has to be a temperature at which the hydrocarbon is not thermally decomposed in the pipe 17. For example, when the temperature in the second vessel 12 is 700 to 750° C., the raw material gas is preferably preheated at a temperature of 350° C. or more and the temperature in the second vessel 12 or less.

(6) Substrate

FIG. 3 shows a sectional view (3A) of a situation where a support film and a catalyst film are stacked in order on a smooth plate, and a sectional view (3B) of a state where MWCNTs are generated on the catalyst film of the substrate respectively.

The substrate 15 is a plate where a support film 15b and the catalyst film 15c are stacked in order on one surface of a smooth plate 15a.

(6. 1) Smooth Plate

The smooth plate 15a does not necessarily requires precise smoothness after mirror polishing if the plate is visually smooth. The smooth plate 15a may be formed from any kind of material if the plate can retain the shape of the plate under the temperature required for synthesis of the MWCNT 40. As a preferable material of the smooth plate 15a, a metal, ceramics, glass or graphite can be cited. As the metal, an iron, nickel, manganese, molybdenum, silicon, cobalt, chrome, tungsten, copper, silver, gold, platinum, or an alloy containing one kind or more of the above described metals can be illustrated. As the ceramics, an alumina, zirconia, silicon carbide, silicon nitride, titania, titanium carbide, titanium nitride and the like can be illustrated. As the glass, quartz glass, blue plate glass, borosilicate glass, alkali-free glass and the like can be illustrated.

(6. 2) Support Film

The support film 15b is a layer for supporting a metal catalyst, and is positioned between the smooth plate 15a and the catalyst film 15c. The support film 15b may be formed from any kind of material if it can maintain the film under the temperature required for synthesis of the MWCNT 40. The support film 15b is formed from only a single element or a plurality of elements (called a first element) supplied onto the smooth plate 15a, an intermetallic compound, an alloy or ceramics, where the first element and a second element on the surface of the smooth plate 15a are combined, an intermetallic compound, an alloy or ceramics, where the above described first element and a third element (for example, oxygen or nitrogen) under a formation environment of the support film 15b are combined, or an intermetallic compound, an alloy or ceramics, where the above described first element, the above described second element and the above described third element are combined.

A forming material of the support film 15b is preferably an aluminum, silicon, zinc, chrome, copper, silver, gold, platinum, or an intermetallic compound, an alloy or ceramics that contains one or more of these metals. When a metal silicon is used for the smooth plate 15a, and zinc is supplied to the silicon plate to form the support film 15b, for example, the support film 15b can be made a film of a zinc, zinc oxide or zinc silicate. Further, when quartz glass is used for the smooth plate 15a, an aluminum or aluminum silicon is supplied to the quartz glass to form the support film 15b, the support film 15b can be made a film of an aluminum, alumina, aluminum silicon or aluminum silicate. Regardless of the material of the smooth plate 15a, the support film 15b may be made a film of an aluminum, alumina, aluminum silicon or aluminum silicate.

Formation of the support film 15b can be realized by a physical vapor deposition method (called a PVD method) using a sputter device, a CVD method using a gas phase reaction, a coat method coating a liquid containing a metal organic compound or metal salt, a dip method dipping the smooth plate 15a in the liquid, a print method printing with the liquid in a form of ink, or the like. For example, in using a physical vapor deposition method, the support film 15b can be formed by sputtering a target of an aluminum or aluminum silicon with inert gas (to be accurate, ionized inert gas) or the like, and depositing sputtered particles on the smooth plate 15a. In using a CVD method, the smooth plate 15a is heated, mixture gas of hydrogen and zinc chloride is supplied to the surface of the smooth plate 15a, and the support film 15b of zinc or zinc oxide can be formed on the surface of the smooth plate 15a. In using a coat method, dip method or print method, the support film 15b of an aluminum can be formed on the smooth plate 15a by supplying a liquid containing a metal organic compound (aluminum tri-n-propoxide or the like) containing an aluminum to the smooth plate 15a and thereafter heating.

Surface roughness of the support film 15b is one of factors influencing surface roughness of the catalyst film 15c (unevenness of a metal catalyst, and Ra after granulation of the catalyst film 15c in the present application). When the surface roughness of the support film 15b is decreased, Ra after the granulation described above also decreases. On the other hand, when the surface roughness of the support film 15b is increased, Ra after the granulation described above also increases. Further, the surface roughness of the support film 15b is also correlated with a thickness of the support film 15b. When the support film 15b is formed to be thick, the surface roughness of the support film 15b increases.

In this embodiment, it is possible to prepare the MWCNT 40 in a straight or nearly straight form having a small number of curves to the MWCNT 40 in a curled form having short curve periods (called "wavelengths". See FIG. 3 (3B).) by making a sharp distinction. When the support film 15b is a film in which center line average roughness (Ra) is 0.5 nm or more, it is possible to prepare the MWCNT 40 forming waves where an average period based on observation of an image by a scanning electron microscope is of 0.5 μm or more and 2.0 μm or less, and in a narrower range, 0.8 μm or more and 2.0 μm or less, in the lengthwise direction of the MWCNT 40. The Ra of the support film 15b is preferably 0.30 nm or more, more preferably 0.37 nm or more, further more preferably 0.50 nm or more, and still more preferably 0.54 nm. An upper limit of Ra of the support film 15b is preferably 0.86 nm, more preferably 0.90 nm, and further more preferably 1.00 nm, though it is not essential. When the Ra of the support film 15b exceeds the above described upper limit value, particles after granulation of the catalyst film 15c become too large, and the MWCNTs 40 having the diameters of the outermost walls exceeding 15 nm tend to increase. Accordingly, in order to easily generate the MWCNT 40 where a wave at the average period of 0.5 μm or more and 2.0 μm or less, and in a narrower range, 0.8 μm or more and 2.0 μm or less can be formed, and the upper limit of the diameter of the outermost wall is 15 nm, the Ra of the support film 15b is preferably 0.30 nm or more and 0.86 nm, more preferably 0.37 nm or more and 0.86 nm or less, further more preferably 0.37 nm or more and 0.90 nm or less, still more preferably 0.50 nm or more and 0.86 nm, and yet more preferably 0.54 nm or more and 0.86 or less. The MWCNT having a wave in which the average period is 0.5 μm or more and 2.0 μm or less, and in a narrower range, 0.8 μm or more and 1.2 μm or less as described above increases the chance of contact of a metal, organic polymer or inorganic particles, and the MWCNT 40, and facilitates mixing with the above described particles more.

(6. 3) Catalyst Film

The catalyst film 15c is a film positioned on the outermost surface of the substrate 15, and to be a generation place of the MWCNT 40. The catalyst film 15c is formed of particles of a metal catalyst. The metal to be the material (material forming the metal catalyst) of the catalyst film 15c is preferably a manganese, iron, cobalt, nickel, molybdenum, palladium, indium, tin or an alloy containing one or more of these metals, and more preferably a manganese, iron, cobalt or an alloy containing one or more of these metals.

Formation of the catalyst film 15c can be realized by a PVD method, CVD method, coat method, dip method, print method or the like similarly to the aforementioned support film 15b. For example, in using a PVD method, the catalyst film 15c can be formed by sputtering a target of a nickel, and depositing nickel particles on the support film 15b. In using a coat method, dip method or print method, the catalyst film 15c of an iron can be formed on the support film 15b by supplying a liquid containing a metal organic compound containing an iron onto the support film 15b and thereafter heating.

The surface roughness after granulation of the catalyst film 15c influences wave formation of the MWCNT 40. When the surface roughness after granulation of the catalyst film 15c is decreased, the wavelengths of the wave become long, and the straight MWCNTs 40 are readily generated. On the other hand, when the surface roughness after granulation of the catalyst film 15c is increased, the wavelengths of the wave is shortened, and the finely curled MWCNTs 40 are readily generated.

When the center line average roughness (Ra) after granulation of the catalyst film 15c is 0.80 nm or more, it is possible to prepare the MWCNT 40 forming a wave in which the average period based on observation of the image by a scanning electron microscope is 0.5 μm or more and 2.0 μm or less, and in a narrower range, 0.8 μm or more and 2.0 μm or less, in the lengthwise direction of the MWCNT 40. The Ra after granulation of the catalyst film 15c is more preferably 0.80 nm or more. The upper limit of the Ra after granulation of the catalyst film 15c is preferably 0.90 nm, and more preferably 1.00 nm. When the Ra after granulation of the catalyst film 15c exceeds 1.00 nm, particles forming the catalyst film 15c become too large, and the MWCNTs 40 with the diameters of the outermost walls exceeding 15 nm tend to increase. Accordingly, in order to easily generate the MWCNT 40 in which the average period is 0.5 μm or more and 2.0 μm or less, and in a narrower range, 0.8 μm or more and 2.0 μm or less can be formed, and the upper limit of the diameter of the outermost wall is 15 nm, the Ra after granulation of the catalyst film 15c is preferably 0.80 nm or more and 0.88 nm or less, more preferably 0.80 nm or more and 0.90 nm or less, and further more preferably 0.80 nm or more and 1.00 nm or less. The MWCNT 40 having the wave in which the average period is 0.5 μm or more and 2.0 μm or less, and in a narrower range, 0.8 μm or more and 2.0 μm or less as described above increases the chance of contact of a metal, organic polymer or organic particles and the MWCNT 40, and more facilitates mixing with the above described particles.

(7) Supply of Raw Material Gas and Exhaust by Pump

Supply of the raw material gas into the reaction vessel, and exhaust by the pump 30 during synthesis of the MWCNT 40 are important to make the length of the MWCNT 40 1.5 mm or more. More specifically, it is important to always supply fresh raw material gas into the second vessel 12.

The present inventor tried a method of circulating the raw material gas while preheating the raw material gas so that the raw material gas returns to the second vessel 12 again through the pump 30 from the second vessel 12, a method of unidirectionally flowing the raw material gas without preheating the gas (non-circulation method), and a method of circulating the raw material gas without preheating the raw material gas. However, it is found that with none of the above described three kinds of methods, the length of the MWCNT 40 can be elongated more than before, and it is difficult to grow the MWCNT 40 to the length of 1.0 mm or more.

On the other hand, it is found that when the raw material gas is preheated, and the raw material gas is supplied to the second vessel 12, and is discharged from the pump 30 by a non-circulation method (that is, a batch method), the length of the MWCNT 40 can be easily grown to 1.0 mm or more. In other words, as an important factor with preheating the raw material gas, it is important to adopt a raw material gas supply method of a batch method in which the raw material gas is supplied to the second vessel 12 and is discharged to outside of the second vessel 12 by the pump 30. It is conceivable that as compared with the circulation method that supplies the raw material gas into the second vessel 12 again from the pump 30, the raw material supply method of a batch method (also called a non-circulation method or non-reflux method) can always supply fresh raw material gas onto the surface of the catalyst film 15c, and therefore can suppress catalyst deactivation, and extend the synthesis time period of the MWCNT 40.

To increase the length of the MWCNT 40, it is an important factor next to the aforementioned two important factors to supply the raw material gas from one end of the substrate 15 to the other end on the opposing side thereof so that the raw material gas is along the surface of the catalyst film 15c.

When the raw material gas is supplied from a substantially perpendicular direction to the surface of the substrate 15, or the raw material gas is supplied into the second vessel 12 regardless of the surface of the substrate 15, a maximum length of the MWCNT 40 is approximately 0.9 mm. It is found that when the raw material gas is passed from one end (for example, an upper end) of the substrate 15 to the other end (a lower end opposing to the upper end) to be along the surface of the catalyst film 15c of the substrate 15, the length of the MWCNT 40 can be easily made 1.0 mm or more. Exhaust by the pump 30 is located in a lower part of the second vessel 12 not to hinder the above described flow of the raw material gas. In other words, by setting the supply position of the raw material gas at an upper part of the second vessel 12, and setting the exhaust position at the lower part of the second vessel 12, the raw material gas flows smoothly to the lower end from the upper end, on the surface of the substrate 15. The flow of the raw material gas like this contributes to further elongation of the MWCNT 40.

The length of the MWCNT 40 also becomes 1.0 mm or more, when the substrate 15 is set horizontally in one or more stages, the raw material gas is supplied along the surface of the catalyst film 15c, and the raw material gas is discharged from the horizontal direction. However, the MWCNT 40 can be made longer when the substrate 15 is erected in the second vessel 12 and the raw material gas is passed from above to below. The reason of this is not known, but this is presumed to be related with the influence of the gravity. The reason is considered to be that elements of deactivation of the catalyst are removed by being influenced by the weight, or the raw material gas is less likely to be turbulent due to the effect of the gravity and flows smoothly over the catalyst film 15c.

According to the method for preparing the MWCNT 40 in the embodiment, a conversion rate in generating the MWCNT 40 by decomposition of hydrocarbon (the case of all carbons in hydrocarbon being converted into the MWCNT 40 is set as 100%) is 30% or more in average, and reaches 70% at the maximum. The conversion rate like this is much higher as compared with the conversion rate (1 to 2% in average, 10% at the maximum) according to the conventionally known preparing method. The reason of this is not clear, but is considered to be related to adopting a batch method of unidirectionally discharging the gas after supplying the raw material gas into the second vessel 12 without circulating the raw material gas, preheating and supplying the raw material gas to the surface of the substrate 15, suppressing the raw material gas from being turbulent over the surface of the substrate 15 and contacting the raw material gas smoothly to the catalyst film 15c, and the like. In the CVD method of the batch method like this embodiment, synthesis of the MWCNT 40 can be kept for 30 to 80 minutes, even a time period exceeding 80 minutes. The long synthesis time like this has been impossible by the conventional preparation of MWCNT (substantially 10 minutes). Synthesis of the MWCNT 40 for a long time period in the embodiment contributes to easy elongation of the length of the MWCNT 40 to 1.0 mm or more.

FIG. 4 schematically shows a state of an inside of the reaction vessel in a state where MWCNTs are generated on the substrates by the apparatus in FIG. 2. FIG. 4 shows only a partial configuration of FIG. 2.

As illustrated in FIG. 4, when a mixture gas of hydrogen (functioning as regulation gas), nitrogen (one example of carrier gas), and acetylene (carbon source) is ejected along the surfaces of the catalyst films 15c of the three substrates 15 and is passed to reach lower end sides of the substrates 15, MWCNTs 40 are generated on the catalyst films 15c contacting the raw material gas. The lengths of the MWCNTs 40 reach 1.0 mm or more that is much longer than the conventional ones.

(8) Method for Preparing MWCNT and Preparing Procedure

Hereinafter, typical examples of a method for preparing the MWCNT 40 and a preparing procedure will be described.

The method for preparing the MWCNT according to the embodiment is a method that holds the substrates 15 supporting metal catalysts on surfaces in the second vessel 12 (corresponding to the reaction vessel), and prepares the MWCNTs 40 by a CVD method. In the method, the support films 15b for supporting the metal catalysts are formed on the surfaces of the smooth plates 15a. Next, the metal catalysts each formed from a manganese, iron, cobalt, nickel, molybdenum, palladium, indium, tin or an alloy containing one or more of these metals are supported on the support films 15b. Next, one or more substrates 15 each having the catalyst film 15c formed of a metal catalyst formed on the surface of the support film 15b are disposed in the second vessel 12. The one or more substrates 15 each supporting the metal catalyst are more preferably erected in the second vessel 12. Next, the inside of the second vessel 12 is decompressed, and is thereafter brought under an atmosphere of inert gas or oxidizing gas. Next, the inside of the second vessel 12 is heated to the synthesis temperature. Next, gas having reduction activity is introduced while being preheated to a temperature capable of promoting granulation on the catalyst film 15c and lower than an atmosphere temperature in the second vessel 12, from one ends (preferably upper ends) of the substrates 15 to the other ends (preferably lower ends) to contact the surfaces of the catalyst films 15c, and the catalyst films 15c are exposed to the reducing gas atmosphere, whereby the catalyst films 15c are granulated. Here, the gas having reduction activity is preferably a hydrogen. Preheating of the gas having reduction activity is not essential, but the gas having reduction activity may be introduced onto the catalyst films 15c without being preheated. Next, as the raw material gas containing at least hydrogen and hydrocarbon is introduced while being preheated to a temperature capable of promoting thermal decomposition of hydrocarbon on the catalyst films 15c, and lower than the synthesis temperature of the MWCNT 40, and the inside of the second vessel is exhausted unidirectionally by a non-circulation method to generate a current in a direction from the one ends (preferably upper ends) to the other ends (preferably lower ends) of the substrates 15, the hydrocarbon is thermally decomposed and the MWCNTs 40 are grown on the surfaces of the catalyst films 15c of the substrates 15.

The apparatus 1 has a structure where the substrates 15 are disposed in a space (in the second vessel 12) surrounded by the heater 13, and the pipe 17 for introducing gas is disposed between the heater 13 and the substrates 15. Accordingly, by energization to the heater 13, preheating of the raw material gas flowing in the pipe 17, and heating of the inside of the second vessel 12 can be simultaneously performed by single heating means called the heater 13. Gas containing at least hydrogen and hydrocarbon is preheated when passing through the pipe 17 to be supplied into the second vessel 12, and flows from one ends of the substrates 15 to the other ends.

As above, the method for preparing MWCNT according to the embodiment includes a step of forming the support film 15b for supporting a metal catalyst, on the surface of the smooth plate 15a, a step of supporting the metal catalyst formed from a manganese, iron, cobalt, nickel, molybdenum, palladium, indium, tin or an alloy containing one or more of these metals, on the support film 15b, a step of placing one or more substrates 15 each having the catalyst film 15c formed of the metal catalyst formed on the surface of the support film 15b, inside of the second vessel 12 (reaction vessel), a step of bringing the inside of the second vessel 12 under an atmosphere of inert gas or oxidizing gas, a step of heating the inside of the second vessel 12 to the synthesis temperature of the MWCNT 40, and a step of thermally decomposing hydrocarbon to grow MWCNTs on the granulated surface of the catalyst film 15c of the substrate 15, as introducing the raw material gas containing at least hydrogen and hydrocarbon from one end of the substrate 15 to the other end to contact the raw material gas to the granulated surface of the catalyst film 15c, while preheating the raw material gas to the temperature capable of promoting thermal decomposition of hydrocarbon on the granulated surface of the catalyst film 15c, and lower than the aforementioned synthesis temperature, and exhausting the inside of the second vessel 12 unidirectionally by a non-circulation method to generate a current in the direction from the one end of the substrate 15 to the other end.

4. Modified Example

The MWCNT 40 may be synthesized by rotating the apparatus 1 90 degrees, supplying the raw material gas along the surface of the horizontal substrate 15, and exhausting the gas to flow the gas from one end of the substrate 15 to the other end. Further, the pipe 17 may pass between the second vessel 12 and the heater 13 without passing through the inside of the second vessel 12.

The number of substrates 15 installed in the second vessel 12 is not limited to three, but may be four or more (40, for example). The pipe 17 may be two or more pipes arranged in a width direction of the substrate 15 instead of a single pipe in an inverted L-shape. In that case, the holes 18 are formed in the respective pipes 17.

EXAMPLES

Next, examples of the present invention will be described. Note that the present invention is not limited to the examples described below. In the following examples and comparative examples, MWCNTs were produced by using the apparatus of the structure shown in FIG. 2, and were subjected to evaluation. In the description of the examples, the reference signs described in the embodiment are omitted.

1. Analysis Method (1) Length and Waving of MWCNTs

The length and the degree of waving (swells) of synthesized MWCNTs were evaluated from an SEM image photographed by a scanning electron microscope (made by JEOL Ltd., model: JSM-7800F), as the MWCNTs were on the substrate or after they were cut from the substrate. In obtaining an average value of the lengths of MWCNTs, 30 MWCNTs were arbitrarily selected from the SEN image, and the average value of the lengths was calculated. Further, as the degree of waving of the MWCNT, a wavelength (also called a period) advancing in a wave form was evaluated. In obtaining each average value (average period) of the periods of one MWCNT, 30 wavelengths were arbitrarily selected along the lengthwise direction of the MWCNT from the SEM image, and the average value of the 30 wavelengths was calculated.

(2) The Number of Walls and Diameter of MWCNT

The number of walls and the diameter of the synthesized MWCNT were evaluated from a TEM image photographed by a transmission electron microscope (made by Hitachi High-Tech Corporation, model: HF2200). In obtaining the average number of walls, arbitrary 30 visual fields were selected from a TEM image from which the numbers of walls of MWCNTs were determinable, and the average value was obtained by rounding off the number after the decimal point in the average value of 30 numbers of walls. Further, in obtaining the average (average diameter) of the diameters of MWCNTs, similarly to the above, arbitrary 30 visual fields were selected from the TEM image, and the average value (unit: an integer value of nm) of 30 diameters was obtained.

(3) Surface Roughness of Deposited Films

The respective roughnesses of the support films and the catalyst films were obtained by preparing the samples with respective films attached, and measuring the roughnesses by an atomic force microscope (made by Bruker Inc., model: Dimension Icon).

(4) Film Thickness

Respective thicknesses of the support films and the catalyst films were obtained by preparing samples with respective films attached, and measuring the thicknesses by an X-ray fluorescence spectrometer (made by Rigaku Corporation, model: ZSX Primus 400).

(5) Specific Surface Area of MWCNT

The specific surface areas (BET values) of MWCNTs were measured by a gas adsorption method (multi point method) using a specific surface area measuring device (made by Shimadzu Corporation, model: 3Flex) based on JIS Z8830 (ISO 9277).

(6) Metal Impurities in MWCNT

Metal impurities in MWCNTs were analyzed by using an ICP mass spectrometer (made by Thermo Fisher Scientific Inc., model: Element 2).

(7) G/D Ratio of MWCNT

The G/D ratios of MWCNTs were obtained by using a Raman microscope (made by Renishaw plc, model: inVia). More specifically, the value was obtained by dividing the peak intensity of a G-band ($1590\ cm^{-1}$) of a Raman spectrum measured by using a Raman microscope by a peak intensity of a D-band ($1350\ cm^{-1}$).

2. Film Deposition

(1) Support Film

For synthesis of MWCNT, the substrates having a three-layer structure of a smooth plate/support film/catalyst film were used. As the smooth plate, a plate-shaped silicon substrate having a width of 100 mm, a length of 100 mm and a thickness of 0.7 mm was used. The support film is a film stacked on one surface of the smooth plate. The support film is made of an aluminum. To form the support film on the smooth plate, the support film was deposited on the smooth plate by a magnetron sputter method by using an aluminum as a target, and argon gas as the gas for use in sputtering. More specifically, the inside of the sputter device was decompressed before sputtering and after reaching 0.02 Pa, argon gas was supplied. Next, under the conditions of the set power of 4 kW, the supply flow rate of argon gas of 500 sccm, and the sputter space pressure of 1 Pa, film deposition was performed to adjust the thickness of the support film by changing the sputter time period.

(2) Catalyst Film

The catalyst film was deposited on the support film surface after deposition of the support film onto the smooth place. To form the catalyst film on the support film, deposition of the catalyst film onto the support film was performed by a magnetron sputter method, by using an iron as the target, and argon gas as the gas for use in sputter. More specifically, after the inside of the sputter device was decompressed to 0.02 Pa before sputter, argon gas was supplied. Next, under the conditions of the set power of 1.5 kW, the supply flow rate of argon gas of 500 sccm, and the sputter space pressure of 3.5 Pa, film deposition was performed by fixing the sputter time period to 40 seconds.

3. Synthesis and Evaluation of MWCNT

(1) Experiment on Synthesis of Long MWCNT

Example 1

Sputtering for 10 seconds was performed to one surface of the silicon substrate with an aluminum as the target, and the support film having the film thickness of 1.6 nm and Ra of 0.2 nm was deposited. Subsequently, sputtering for 40 seconds was performed onto the support film with an iron as the target, and the catalyst film having the film thickness of 1.0 nm was deposited.

Next, three substrates with the catalyst films deposited thereon were prepared, and the three substrates were erected on the base (called a boat) of quartz in the CVD device (see FIG. 2) not to fall down. Next, the second vessel (reaction vessel) was closed, and the heater is energized simultaneously with decompressing the inside of the second vessel to 1 Pa to start heating in the second vessel. Next, at the time point when the temperature in the second vessel became close to 700° C., nitrogen gas was supplied into the second vessel, and exhaustion in the second vessel by the pump was continuously performed so that the pressure in the second vessel can be kept at 90 kPa.

Next, the inside of the second vessel was heated to 750° C., both nitrogen gas and hydrogen gas were supplied into the second vessel, the pressure in the second vessel was kept at 30 kPa, and as a result, granulation of the catalyst film occurred. After the temperature in the second vessel reached 750° C., nitrogen gas, hydrogen gas and acetylene gas were supplied along the catalyst film surfaces from the upper ends to the lower ends of the substrates in the second vessel while preheating by the above describe heater was performed, and while the pressure in the second vessel was kept at 30 kPa, synthesis of MWCNTs onto the substrates was started. The mass flow controllers for the respective gases were regulated so that the respective supply flow rates of nitrogen gas, hydrogen gas and acetylene gas become 100 slm, 100 slm and 10 slm respectively. Synthesis of MWCNTs was performed continuously for approximately 60 minutes. The mixture gas of the above described three kinds of gases was exhausted to outside of the apparatus continuously with the pump after MWCNs were synthesized onto the substrates. In other words, synthesis of example 1 is synthesis of a batch type.

After synthesis of MWCNTs, the supply gasses into the second vessel were changed to only nitrogen gas, and while the pressure in the second vessel was kept at 90 kPa, the temperature was decreased to a room temperature from 750° C.

Next, the second vessel was opened, and the substrates were extracted. The MWCNTs were subjected to various evaluations of length, number of walls, diameter, wave state, specific surface area, G/D ratio and the metal impurity content.

As a result of the evaluations, linear MWCNTs having lengths of 1.7 to 2.1 mm, an average length of 2.0 mm, numbers of walls of 6, diameters of 7 to 10 nm, an average diameter of 9 nm, specific surface areas of 364 $m^2/g$, G/D ratios of 0.9, and metal impurity contents of 250 ppm by weight with almost no wave were obtained.

FIG. 5 is SEM photographs (magnifications at the time of shooting: 40 times and 30000 times) of the MWCNTs (with the substrate) obtained in example 1, viewed from the side. FIG. 6 is a TEM image of the MWCNT similar to FIG. 5. The magnification at the time of shooting of the TEM photograph is one million times.

Example 2

Synthesis of MWCNTs was performed by changing acetylene gas in the raw material gas to ethylene gas, changing the inside of the second vessel to 700° C. from 750° C., and setting the other conditions as the same conditions as in example 1. As a result, linear MWCNTs having lengths of 1.0 to 1.6 mm, an average length of 1.4 mm, numbers of walls of 6, diameters of 3 to 11 nm, an average diameter of 7 nm, specific surface areas of 278 $m^2/g$, G/D ratios of 0.9, and metal impurity contents of 221 ppm by weight with almost no wave were obtained.

Comparative Example 1

Nitrogen gas, hydrogen gas and acetylene gas were supplied to the surfaces of the substrates without being preheated, by supplying these gases into the second vessel from an arrow B of the apparatus in FIG. 2. The other conditions were the same conditions as in example 1.

As a result of evaluating the obtained MWCNTs, the linear MWCNTs having lengths of 0.3 to 0.6 mm, an average length of 0.5 mm, numbers of walls of 7, diameters of 6 to 11 nm, an average diameter of 9 nm, specific surface areas of 320 $m^2/g$, G/D ratios of 0.9, and metal impurity contents of 870 ppm by weight with almost no wave were obtained. Under the conditions of comparative example 1, the synthesis time period of the MWCNTs (14 minutes) was shorter than in example 1, and the MWCNTs shorter than the MWCNTs obtained in example 1 were obtained.

Comparative Example 2

Nitrogen gas, hydrogen gas and acetylene gas were supplied similarly to example 1, the valve was switched 5 minutes after the supply, and connection is made from the pump to an arrow A of the apparatus in FIG. 2 to preheat the raw material gas, but the raw material gas was supplied to the surfaces of the substrates by a reflux method (also called a circulation method) instead of a batch method. The other conditions were the same conditions as in example 1.

As a result of evaluating the obtained MWCNTs, the linear MWCNTs having lengths of 0.1 to 0.4 mm, an average length of 0.2 mm, numbers of walls of 6, diameters of 6 to 11 nm, an average diameter of 10 nm, specific surface areas of 280 m²/g, G/D ratios of 0.7, and metal impurity contents of 1300 ppm by weight with almost no wave were obtained. Under the conditions of comparative example 2, the synthesis time period of the MWCNTs (7 minutes) was shorter than in example 1, and the MWCNTs shorter than the MWCNTs obtained in example 1 were obtained.

Comparative Example 3

Nitrogen gas, hydrogen gas and acetylene gas were supplied similarly to example 1, the valve was switched 5 minutes after the supply, connection was made from the pump to the arrow B of the apparatus in FIG. 2, and the raw material gas was supplied to the surfaces of the substrates without being preheated, by a reflux method (also called a circulation method) instead of a batch method. In other words, both the conditions of comparative 1 and comparative 2 were satisfied, and the other conditions were the same conditions as in comparative example 1.

As a result of evaluating the obtained MWCNTs, the linear MWCNTs having lengths of 0.05 to 0.1 mm, an average length of 0.08 mm, numbers of walls of 8, diameters of 7 to 13 nm, an average diameter of 12 nm, specific surface areas of 176 m²/g, G/D ratios of 0.7, and metal impurity contents of 5300 ppm by weight with almost no wave were obtained. Under the conditions of comparative example 3, the synthesis time period of the MWCNTs was shorter (5 minutes) than in example 1, and the MWCNTs shorter than the MWCNTs obtained in example 1 were obtained.

Table 1 shows the evaluation results of the MWCNTs obtained under the conditions of examples 1 and 2 and comparative examples 1 to 3. In Table 1, "Min." means a minimum value, "Max." means a maximum value, and "Ave." means an average value. The aspect ratio (k) in Table 1 is shown in unit of 1000. The above described contents in Table 1 also apply to the following tables.

TABLE 1

| | Evaluation results of the MWCNTs | | | | | | | | |
| --- | --- | --- | --- | --- | --- | --- | --- | --- | --- |
| | Diameter (nm) | | | Length (mm) | | | Aspect ratio (k) | | |
| | Min. | Max. | Ave. | Min. | Max. | Ave. | Min. | Max. | Ave. |
| Example 1 | 7 | 10 | 9 | 1.7 | 2.1 | 2.0 | 211 | 253 | 222 |
| Example 2 | 3 | 11 | 7 | 1.0 | 1.6 | 1.4 | 123 | 427 | 235 |
| Comparative example 1 | 6 | 11 | 9 | 0.3 | 0.6 | 0.5 | 46 | 65 | 56 |
| Comparative example 2 | 6 | 11 | 10 | 0.1 | 0.4 | 0.2 | 11 | 36 | 20 |
| Comparative example 3 | 7 | 13 | 12 | 0.05 | 0.10 | 0.08 | 6 | 8 | 7 |

It is found that the MWCNTs obtained under the conditions of example 1 are long MWCNT having lengths of 1.7 mm or more, and high aspect ratios (210000 or more) with the average diameter of outermost walls of 9 nm with almost no wave. Further, the MWCNTs obtained under the conditions of example 2 also have lengths of 1.0 mm or more. It is found that the MWCNTs having long lengths of 1.0 mm or more and high aspect ratios can be obtained by supplying the raw material gas to the reaction vessel by preheating the raw material gas by a batch method, and by supplying the raw material gas along the surfaces of the catalyst films. On the other hand, the MWCNTs obtained under the conditions of comparative examples 1 to 3 all have small lengths of less than 1 mm (in more detail, 0.6 mm or less) and low aspect ratios.

(2) Experiment on Synthesis of Long and Waving MWCNT

Example 3

Synthesis of MWCNTs was performed under the same conditions as in example 1, except that the time period of deposition of the support film onto the smooth plate was made longer than that in example 1, and the thickness of the support film was increased to 3.0 nm from 1.6 nm. The center line average roughness (Ra) of the support film was 0.37 nm when the thickness of the support film was made 3.0 nm. After granulation of the catalyst film (hereinafter, also simply called "after granulation"), Ra was 0.8 nm.

FIG. 7 is an SEM photograph of the MWCNTs (with the substrate) obtained in example 3, viewed from the side. Magnification at the time of shooting of the SEM photograph was 30000 times.

The MWCNTs in the photograph in FIG. 7 have waves with shorter average periods (finely curled waves) as compared with the MWCNTs (see FIG. 5) in example 1. The average period of the waves was 2.0 μm.

Example 4

Synthesis of MWCNTs was performed under the same conditions as in example 3, except that the time period of deposition of the support films onto the smooth plates was made longer than in example 3, and the thickness of the support films was increased to 4.5 nm from 3.0 nm. The center line average roughness (Ra) of the support film was 0.54 nm when the thickness of the support film was made 4.5 nm. After granulation, Ra was 0.87 nm.

FIG. 8 is an SEM photograph of the MWCNTs (with the substrate) obtained in example 4, viewed from the side. Magnification at the time of shooting of the SEM photograph is 30000 times. FIG. 9 is AFM images (2D images and 3D images) by an atomic force microscope, of the catalyst films of the substrates used in examples 4 and 1. The AFM images of example 1 is shown to be compared with example 4.

The MWCNTs on the photograph in FIG. 8 have waves with a much shorter average period as compared with the MWCNTs (see FIG. 7) in example 3. The average period of the waves was 1.2 μm. Further, from the result in FIG. 9, it is found that when Ra of the support film is large, Ra after granulation of the catalyst film also becomes large.

Example 5

Synthesis of MWCNTs was performed under the same conditions as in example 4, except that the time period of deposition of the support films onto the smooth plates was made longer than in example 4, and the thickness of the support films was increased to 6.0 nm from 4.5 nm. The center line average roughness (Ra) of the support film at the time of the thickness of the support film being increased to 6.0 nm was 0.86 nm. After granulation, Ra was 0.88 nm.

FIG. 10 is an SEM photograph of the MWCNTs (with the substrate) obtained in example 5, viewed from the side. Magnification at the time of shooting of the SEM photograph was 30000 times.

The MWCNTs in the photograph in FIG. 10 have waves with a much shorter average period as compared with the MWCNTs (see FIG. 8) in example 4. The average period of the waves was 0.8 μm.

Table 2 shows the evaluation results of the MWCNTs obtained under the conditions of examples 3 to 5 and the evaluation results of the support films. Table 2 also shows the result of example 1 as comparison.

FIG. 11 shows a graph where the relationship between the thickness of the support film and Ra is plotted. FIG. 12 shows a graph where the relationship between Ra of the support film in FIG. 11 and Ra after granulation of the catalyst film is plotted.

The graph in FIG. 11 shows that as the thickness of the support film becomes larger, Ra of the support film becomes linearly larger. Further, the graph in FIG. 12 shows that as Ra of the support film becomes larger, Ra measured after granulating the catalyst film stacked on the support film tends to be larger initially, but thereafter tends to be saturated to a fixed value. It is found that by increasing Ra of the support film, the periods of the waves of the MWCNTs are shortened, and the MWCNTs having more finely curled waves were obtained. When the support film was made the film having Ra of 0.37 nm or more, the film having Ra after granulation of the catalyst film formed from a metal catalyst of 0.80 nm or more was able to be formed. As a result, MWCNTs forming waves having the average periods of 0.8 μm or more and 2.0 μm or less based on observation of the image by a scanning electron microscope in the lengthwise direction were formed. These results show that to shorten the average period of the waves of the MWCNT, it is preferable to thicken the support film to increase Ra, and to increase Ra after granulation of the catalyst film as a result.

The multi-walled carbon nanotubes and the aggregate thereof of the present invention can be used, for example, in a filler for producing a composite material having high conductivity or thermal conductivity by being mixed into a resin or rubber having low conductivity or thermal conductivity, a filler for producing a high strength composite material by being dispersed into a resin, rubber or metal, and the like.

What is claimed is:

1. A multi-walled carbon nanotube having two or more tubes of a graphene sheet where carbon atoms are arranged in a hexagonal honeycomb form, coaxially,
   wherein a diameter of an outermost wall is 3 nm or more and 15 nm or less, and a length is 1.0 mm or more, and
   wherein a wave where an average period based on observation of an image by a scanning electron microscope is 0.5 μm or more and 2.0 μm or less is formed in a lengthwise direction.

2. The multi-walled carbon nanotube of claim 1, wherein the diameter of the outermost wall is determined based on observation of an image by a transmission electron microscope, and the length is determined based on observation of an image of a scanning electron microscope.

TABLE 2

| | Evaluation results of the MWCNTs | | | | | | | | | | Support film | |
|---|---|---|---|---|---|---|---|---|---|---|---|---|
| | Diameter (nm) | | | Length (nm) | | | Aspect ratio (k) | | | Ave. period of waves | Thickness | Ra |
| | Min. | Max. | Ave. | Min. | Max. | Ave. | Min. | Max. | Ave. | (μm) | (nm) | (nm) |
| Example 3 | 8 | 12 | 11 | 1.9 | 2.3 | 2.1 | 165 | 203 | 191 | 2.0 | 3.0 | 0.37 |
| Example 4 | 9 | 13 | 12 | 2.0 | 2.4 | 2.2 | 166 | 234 | 183 | 1.2 | 4.5 | 0.54 |
| Example 5 | 10 | 15 | 12 | 2.1 | 2.5 | 2.4 | 191 | 239 | 200 | 0.8 | 6.0 | 0.86 |
| Example 1 (Comparison) | 7 | 10 | 9 | 1.7 | 2.1 | 2.0 | 211 | 253 | 222 | 6.0 | 1.6 | 0.20 |

3. A multi-walled carbon nanotube aggregate that is an aggregate of multi-walled carbon nanotubes each having two or more tubes of a graphene sheet where carbon atoms are arranged in a hexagonal honeycomb form, coaxially,
   wherein an average diameter of outermost walls is 6 nm or more and 12 nm or less, and an average length is 1.4 mm or more, and
   wherein in a lengthwise direction of multi-walled carbon nanotubes in the multi-walled carbon nanotube aggregate, waves where average periods based on observation of an image by a scanning electron microscope are 0.5 μm or more and 2.0 μm or less are formed.

4. The multi-walled carbon nanotube aggregate of claim 3, wherein a metal content is 250 ppm or less by weight.

5. The multi-walled carbon nanotube aggregate of claim 3, wherein a metal content is 250 ppm or less by weight.

6. The multi-walled carbon nanotube of claim 3, wherein the average diameter of the outermost walls is determined based on observation of an image by a transmission electron microscope, and the average length is determined based on observation of an image of a scanning electron microscope.

\* \* \* \* \*